United States Patent [19]

Kurihara et al.

[11] Patent Number: 4,924,397
[45] Date of Patent: May 8, 1990

[54] VEHICLE CRUISE CONTROL SYSTEM

[75] Inventors: Norimitsu Kurihara; Masahiko Asakura, both of Wako; Mitsuru Matsui, Kiryu; Yasuhiko Otsuka, Kiryu; Kazuhiko Tachikawa, Kiryu, all of Japan

[73] Assignees: Honda Giken Kogyo K.K., Tokyo; Mitsuba Electric Mfg. Co., Ltd., Gunma, both of Japan

[21] Appl. No.: 129,257

[22] Filed: Dec. 7, 1987

[30] Foreign Application Priority Data

| Dec. 8, 1986 | [JP] | Japan | 61-292940 |
| Dec. 8, 1986 | [JP] | Japan | 61-291941 |
| Apr. 16, 1987 | [JP] | Japan | 62-094157 |
| Apr. 16, 1987 | [JP] | Japan | 62-094158 |
| Apr. 30, 1987 | [JP] | Japan | 62-106875 |

[51] Int. Cl.$^5$ .............................. B60K 31/00
[52] U.S. Cl. .......................... 364/426.04; 180/179
[58] Field of Search ................ 364/426, 431.07, 565, 364/426.01, 424.03, 426.04; 324/160, 161; 180/170, 171, 179; 123/352

[56] References Cited

U.S. PATENT DOCUMENTS

| 4,273,208 | 6/1981 | Liermann | 180/179 |
| 4,380,799 | 4/1983 | Allord et al. | 364/426 |
| 4,394,739 | 7/1983 | Suzuki et al. | 180/179 X |
| 4,434,469 | 2/1984 | Suzuki et al. | 364/426.04 |
| 4,451,888 | 5/1984 | Kuno et al. | 364/431.07 X |
| 4,451,890 | 5/1984 | Suzuki et al. | 364/426 |
| 4,524,893 | 6/1985 | Class et al. | 123/352 X |
| 4,539,642 | 9/1985 | Mizuno et al. | 364/431.07 X |
| 4,540,060 | 9/1985 | Kawata et al. | 364/431.07 X |

FOREIGN PATENT DOCUMENTS 57-119682 7/1982 Japan.

Primary Examiner—Eugene R. LaRoche
Assistant Examiner—Benny Lee
Attorney, Agent, or Firm—Skjerven, Morrill, MacPherson, Franklin, & Friel

[57] ABSTRACT

A vehicle cruise control system, comprising a control circuit for producing a control signal for maintaining a speed of a vehicle at a fixed level according to a difference between an actual vehicle speed and a target vehicle speed, and a drive circuit for producing a drive signal for selectively driving an actuator in a direction either to accelerate the vehicle or to decelerate the vehicle according to the control signal from the control circuit. The drive circuit is provided with a transistor bridge circuit comprising four drive transistors for producing the drive signal. The control circuit is provided with a detection means for detecting an abnormal state of the system and an inhibiting means which brings at least one of the drive transistors into an non-conductive state when any abnormal state is detected by the detecting means. The control circuit may be programmed to perform a certain diagnostic procedure for testing the soundness of the drive transistors. Thus, erratic behavior of the cruise control system and destruction of the drive transistors can be effectively prevented.

17 Claims, 3 Drawing Sheets

VEHICLE CRUISE CONTROL SYSTEM

TECHNICAL FIELD

The present invention relates to a vehicle cruise control system for automatically maintaining the speed of a vehicle at a fixed level.

BACKGROUND OF THE INVENTION

Various forms of cruise control systems are known. According to a typical cruise control system for an automobile, after a desired vehicle speed has been reached by manual operation of the throttle pedal, the set switch is activated and the actuator takes over the control of the throttle pedal and automatically maintains the vehicle speed at a constant level without requiring any efforts on the part of the driver.

The actuator for such a cruise control system may consist of a vacuum actuator using engine vacuum or a motor driven actuator. A motor driven actuator is highly compact and is capable of performing an accurate control action. Typically, a transistor bridge circuit is used to selectively drive the actuator in either direction according to the need to accelerate or decelerate the vehicle.

Such a drive circuit is required to be highly reliable and is desired to be equipped with various protective and fail-safe features. For instance, a CPU consisting of a micro processor used in the control unit for a cruise control system is normally provided with a watch dog timer circuit which keeps producing a certain steady pulse signal as long as the CPU is functioning normally, but produces a certain abnormal DC signal or a high frequency signal when the CPU has ceased to function normally. The abnormal output of this watch dog timer circuit is typically used to disconnect the electromagnetic clutch provided in the output shaft of the actuator to terminate the action of the cruise control.

However, when the CPU stops functioning normally, it could produce confused control signals to the drive transistors and, depending on the combination of the confused control signals, some of the drive transistors may short-circuit and may be destroyed in a very short time. Therefore, it is desirable to provide a protective circuit to such a transistor bridge circuit and an example of such a protective circuit is disclosed in Japanese patent laid-open publication No. 57-119682. According to this disclosed protective circuit, a certain interlock circuit is provided to each pair of transistors which are not desired to be in conductive states at the same time so as to prevent them from being brought into conductive states at the same time. However, this solution involves the use of power transistors for conducting large electric current and this prevents compact design of the system and causes an increase in the manufacturing cost.

Furthermore, even when no short-circuiting takes place, it is desirable whenever the CPU produces a confused output to disconnect the actuator or to drive the actuator in the direction to decelerate the vehicle according to the principle of fail-safe. However, the above mentioned solution does not offer this advantage.

Typically, a cruise control is terminated when a brake pedal is pressed, when a clutch pedal is activated, and when a transmission gear is shifted. Additionally, as safety features, it is desirable to terminate the cruise control and/or to drive the actuator in the direction to decelerate the vehicle when the rotational speed of the engine has exceeded a certain limit, and when the vehicle speed has fallen below the target vehicle speed beyond a certain limit, and when any abnormal condition in the control circuit is detected. However, depending on the speed of the activation of such protective circuits, electric current may continue to be supplied to the drive circuit for a time period between the time point when the cruise control is activated the time point when the cruise control is terminated upon detection of any abnormal condition and this could cause destruction of a part of the circuitry or make the existing abnormal condition even worse.

Therefore, it is highly desirable to run a self diagnostic routine before the cruise control is activated in view of improving the fail safe features of the cruise control system.

In view of such problems of the prior art, a primary object of the present invention is to provide a vehicle cruise control system which fails in a safe manner whenever the CPU of the cruise control system produces a confused output.

Another object of the present invention is to provide a vehicle cruise control system which is reliable and permits a compact design.

According to the present invention, these and other objects of the present invention can be accomplished by providing a vehicle cruise control system, comprising a control circuit for producing a control signal for maintaining a speed of a vehicle at a fixed level according to a difference between an actual vehicle speed and a target vehicle speed, and a drive circuit for producing a drive signal for selectively driving an actuator in a direction either to accelerate the vehicle or to decelerate the vehicle according to the control signal from the control circuit, wherein: the drive circuit is provided with a transistor bridge circuit comprising four drive transistors for producing the drive signal while the control circuit is provided with a detection means for detecting an abnormal state of the system and an inhibiting means which brings at least one of the drive transistors into a non-conductive state when any abnormal state is detected by the detecting means.

Thus, even when the control circuit produces a confused control signal, the detection means forces one of the drive transistors, typically one of the acceleration drive transistors, into a non-conductive state and not only the short-circuiting of the drive transistors is avoided but also the system is allowed to fail in a safe manner. One of the deceleration drive transistors may be brought into either a conductive state or non-conductive state.

The detection means may comprise a circuit for monitoring the state of one of the drive transistors or a watch dog timer circuit for monitoring the action of a micro processor in the control circuit.

According to a certain aspect of the present invention, the drive circuit comprises an acceleration drive circuit and a deceleration drive circuit, and the acceleration drive circuit is connected to a power line by way of a brake switch which opens upon pressing of a brake pedal while the deceleration drive circuit is directly connected to a power line as a favorable feature for permitting the system to be shut off and/or to decelerate the vehicle in a reliable manner.

According to another aspect of the present invention, by sending a signal to one of the drive transistors to close it after a power switch of the vehicle cruise control system is turned on and before the set switch is activated, the opening capabilities of the transistors which are connected in series with the said closed drive transistor can be tested.

In a vehicle cruise control system having a lower limit switch for disconnecting the motor when a limit of a stroke of the motor to decelerate the vehicle has been reached, by sending a deceleration signal to the transistor bridge circuit after a set switch for initiating a cruise control is activated and before the electromagnetic clutch is connected, the opening capabilities of the drive transistors located in a path for accelerating the vehicle can be tested. If an acceleration signal is sent to the transistor bridge circuit, the opening capabilities of the drive transistors in the path for decelerating the vehicle can be tested. Further, by sending a boosted acceleration signal for taking up slack in the linkage existing between the working end of the actuator and a speed control means of a vehicle engine immediately after the electromagnetic clutch is connected, the closing capabilities of the drive transistors located in a path for accelerating the vehicle can be tested.

The opening capability of the transistor for driving the electromagnetic clutch can be tested by detecting electric current conducted by the transistor after the set switch for initiating the cruise control is activated and before the electromagnetic clutch is connected, and the closing capability of the transistor for driving the electromagnetic clutch can be tested by detecting electric current conducted by the transistors after the electromagnetic clutch is connected.

BRIEF DESCRIPTION OF THE DRAWINGS

Now the present invention is described in the following with reference to the appended drawings, in which.

DETAILED DESCRIPTION OF THE PREFERRED EMBODIMENT

Figure 1:
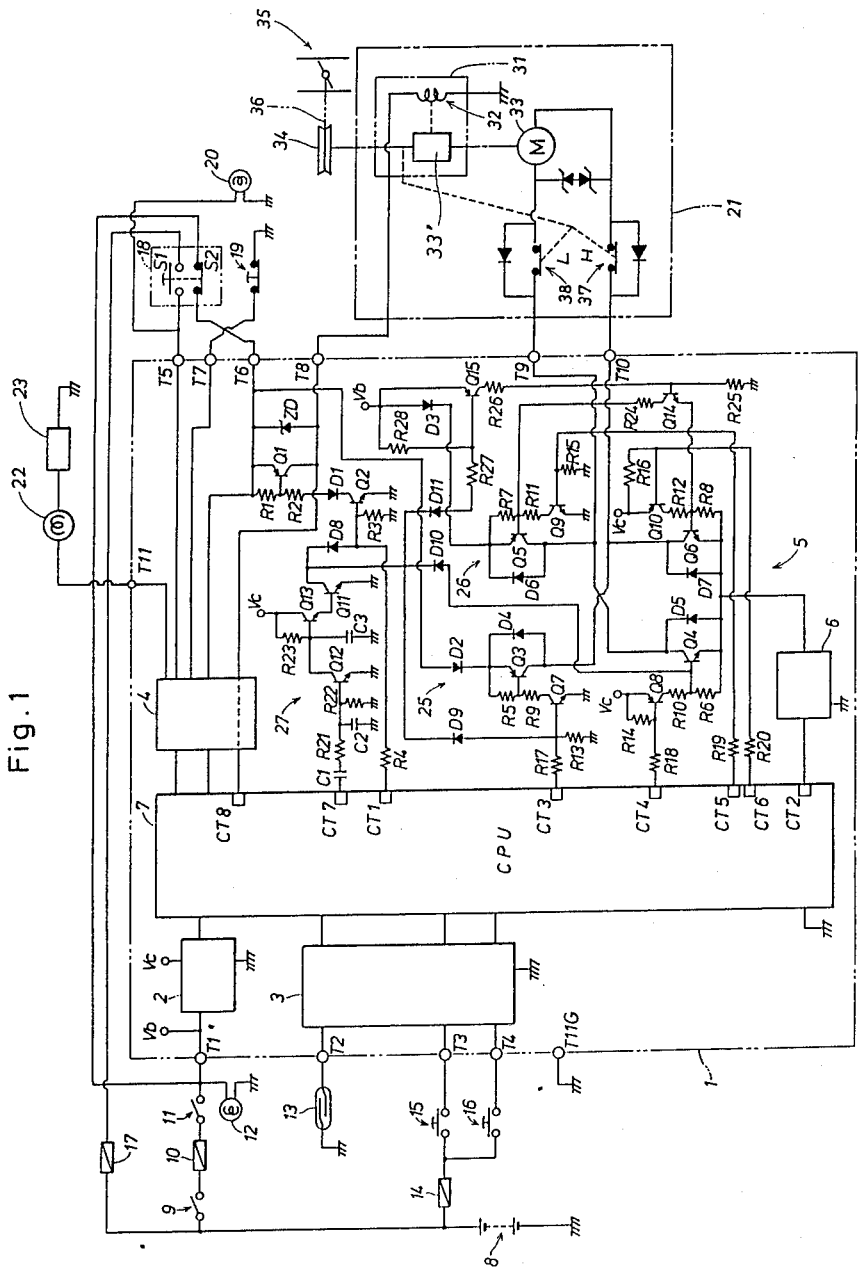
FIG. 1 is a circuit diagram of an embodiment of the vehicle cruise control system according to the present invention.

FIG. 1 is a circuit diagram of an embodiment of the cruise control system according to the present invention. The control of this system is provided by a control unit 1 which comprises a voltage-regulator 2, an input control circuit 3, an input/output control circuit 4, an actuator drive circuit 5, an electric current detecting circuit 6 and a CPU 7 which consists of a micro processor.

A terminal T1 of the control unit 1 receives a voltage from a battery 8 serving as a power source by way of an ignition switch 9, an over-current fuse 10 and a main switch 11. A main indicator lamp 12 is connected across the control unit end of the main switch 11 and the ground. In the control unit 1, the terminal T1 is connected to an input of the voltage regulator 2 and the regulated voltage which is produced at an output end of the voltage regulator 2 is supplied to the CPU 7.

An output signal from a vehicle speed sensor 13 is supplied to an input of the input control circuit 3 by way of a terminal T2 of the control unit 1 and signals from a set switch 15 and a resume switch 16 which are connected to the battery 8 by way of a common fuse 14 are supplied to terminals T3 and T4 of the control unit 1. The signals from the vehicle sensor 13, the set switch 15 and the resume switch 16 are supplied to the CPU 7 by way of terminals T2, T3 and T4, respectively, and the input control circuit 3. Terminal T11G is a ground terminal of the control unit 1.

Terminals T5 and T6 of the control unit 1 are connected to contacts S1 and S2 of a brake switch 18 which detects the activation of a brake pedal which is not shown in the drawings. The contact S1 is a normally open contact which connects the terminal T5 to the battery 8 by way of a fuse 17 when the brake pedal is pressed while the contact S2 is a normally closed contact which connects the terminal T6 to the nonregulated power line Vb when the brake pedal is not pressed. Additionally, a terminal T7 of the control unit 1 is connected to a clutch switch 19 which opens when a clutch pedal (not shown in the drawings) is pressed and connects the terminal T7 to the ground when the clutch pedal is not pressed. A brake lamp 20 is connected across the terminal T5 and the ground for the purpose of warning the vehicles running behind of the activation of the brake. A terminal T11 of the control unit 1 which is connected to an output terminal of the input/output control circuit 4 is connected to a cruise lamp 22 having a dimmer circuit 23. The cruise lamp 22 indicates the cruise control is in progress and the dimmer circuit 23 controls the brightness of the cruise lamp 22 depending on whether the illumination lamps of the instrument panel are lighted up or not.

Terminals T8 to T10 of the control unit 1 are connected to a motor-driven actuator unit 21. The actuator unit 21 comprises an electric motor 33, an electromagnetic clutch 31 having a solenoid 32 for selectively connecting the output shaft 33' of the motor 33 to a pulley 34 which is connected to a throttle valve 35 of the carburetor of the vehicle engine by way of a control cable 36, and limit switches 37 and 38 for detecting, if either one of the two ends of the stroke of the actuator unit 21 has been reached.

A terminal T10 which supplies electric current for driving the motor 33, in the direction to cause the acceleration of the vehicle, is connected to an end of the motor 33 by way of the limit switch 37 which is a normally closed switch for detecting the end of the acceleration stroke of the actuator unit 21. The diode D7 connected in parallel with the switch 37 conducts electric current in the direction to decelerate the vehicle even when the limit switch 37 is open. The terminal T9 which supplies electric current for driving the motor 33 in the direction to cause the deceleration of the vehicle is connected to the other end of the motor 33 by way of the limit switch 38 which is a normally closed switch for detecting the end of the deceleration stroke of the actuator unit 21. The diode D8 connected in parallel with the limit switch 38 conducts electric current in the direction to accelerate the vehicle even when the limit switch 38 is open.

The limit switches 37 and 38 detect two ends of the stroke of the working end of the actuator unit 21 which is directly connected to the linkage system for controlling the throttle valve 35. Here, it should be noted that the working end of the actuator is connected to the linkage system between the throttle pedal and the throttle valve in such a manner that the actuator can depress the throttle pedal as it opens the throttle valve but remains in its original position when the throttle pedal is depressed by the driver. Closing of the throttle valve is effected by return springs provided to the throttle valve and the throttle pedal.

Inside the control unit, the terminals T5 to T8 are also connected to the input/output control circuit 4 which is in turn connected to the CPU 7. Thus, the terminals T5 and T6 transmit signals from the brake switch 18 to the CPU 7 by way of the input/output control circuit 4.

The terminal T6 is connected to the emitter of a transistor Q1 while the terminal T8 is connected to the collector of the same transistor Q1. A zener diode ZD is connected across the emitter and the collector of the transistor Q1. A resistor R1 is connected across the emitter and the base of the transistor Q1 and the base of this transistor Q1 is connected, by way of a resistor R2 and a diode D1, to the collector of a transistor Q2 having a grounded emitter. The diode D1 permits the flow of electric current from the base of the transistor Q1 to the collector of the transistor Q2. Further, the collector of the transistor Q1 is connected to the line connected from the input/output control circuit 4 to the solenoid 32 of the electromagnetic clutch 31 by way of the terminal T8. This line is connected to a terminal CT8 of the CPU 7 by way of the input/output control circuit 4 for detecting the state of the transistor Q1 as described hereinafter.

The base of the transistor Q2 is grounded by way of a resistor R3 and is also connected to a terminal CT1 of the CPU 7 by way of a resistor R4. Depending on the state of the terminal CT1, the transistors Q1 and Q2 turn on and off, thus activating or deactivating the solenoid 32 of the electromagnetic clutch 31.

The actuator drive circuit 5 consists of a transistor bridge circuit for driving the motor 33 in either direction as desired according to a control signal from the CPU 7. This bridge circuit comprises a pair of PNP transistors Q3 and Q5 and another pair of NPN transistors Q4 and Q6. As shown in the drawings, the collector of the first transistor Q3 of the transistor bridge circuit is connected to the collector of the second transistor Q4 of the transistor bridge circuit by way of the terminal T10, the limit switch 37, the motor 33, the limit switch 38 and the terminal T9, to selectively supply electric current for acceleration to the motor 33 while the collector of the third transistor Q5 is connected to the collector of the fourth transistor Q6 by way of the terminal T9, the limit switch 38, the motor 33, the limit switch 37 and the terminal T10, to selectively supply electric current for deceleration to the motor 33. Additionally, the collector of the first transistor Q3 is directly connected to the collector of the fourth transistor Q6 while the collector of the third transistor Q5 is directly connected to the third transistor Q4.

To supply electric power to the transistor bridge circuit, the terminal T6 is connected to the emitter of the transistor Q3 by way of a diode D2 while the unregulated electric power line Vb is connected to the emitter of the transistor Q5 by way of a diode D3. The emitters of the transistors Q4 and Q6 are connected in common and are grounded by way of a current detection circuit 6 which is also connected to a terminal CT2 of the CPU 7.

A diode D4 is connected across the emitter and the collector of the transistor Q3 with its anode end connected to the collector while another diode D6 is connected across the emitter and the collector of the transistor Q5 with its anode end connected to the collector. A diode D5 is connected across the emitter and the collector of the transistor Q4 with its anode end connected to the emitter while the diode D7 is connected across the emitter and the collector of the transistor Q6 with its anode end connected to the emitter.

Each resistor R5 to R8 is connected across the emitter and the base of each of these transistor Q3 to Q6, and the base of each of these transistors Q3 to Q6 is connected to the collector of a corresponding driver transistor Q7 to Q10 by way of a resistor R9 to R12. The emitters of the transistors Q7 and Q9 are directly grounded while the bases of the transistors Q7 and Q9 are grounded by way of resistors R13 and R15, respectively. The emitters of the transistors Q8 and Q10 are connected to the regulated power line Vc while the bases of these transistors Q8 and Q10 are also connected to the regulated power terminal Vc, however, in the latter case by way of resistors R14 and R16, respectively. The bases of the driver transistors Q7 to Q10 are connected to corresponding terminals CT3 to CT6 of the CPU 7 by way of individual resistors R17 to R20, respectively.

The base of the transistor Q2 for driving the solenoid 32 of the electromagnetic clutch 31 is connected, by way of a diode D8, to the collector of a transistor Q11 having a grounded emitter and forming an output end of a watch dog timer circuit 27 which is described hereinafter.

Now the structure of the watch dog timer circuit 27 is described in the following. A terminal CT7 of the CPU 7 normally produces a 4 Hz pulse signal. However, when any abnormal condition is produced in the CPU 7, the terminal CT7 may be kept at 0-volt L level or 5-volt H level indefinitely or may produce a 400 kHz high frequency signal depending on the kind of abnormality which may have occurred in the CPU 7.

This terminal CT7 is connected to the base of a transistor Q12 having a grounded emitter by way of a capacitor C1 and a resistor R21 which are connected in series. The base of this transistor Q12 is also grounded by way of a capacitor C2 and a resistor R22 which are connected in parallel. The collector of this transistor Q12 is connected to the base of a transistor Q13. The collector of the transistor Q13 is connected to the regulated power line Vc and a resistor R23 is connected across the collector and the base of the transistor Q13. The emitter of the transistor Q13 is connected to the base of the transistor Q11 as described earlier.

In this watch dog timer circuit 27, the capacitor C1, the resistor R2, the capacitor C2 and the resistor 22 form a band-pass filter which allows the passage of the normal 4 Hz pulse signal from the terminal CT7 but shuts off the abnormal DC signal and the abnormal 400 kHz high frequency signal. Therefore, under the normal condition, the transistor Q12 turns on and off at the frequency of 4 Hz and since the time constant of the resistor R23 and the capacitor C3 is sufficiently great, the capacitor C3 is never fully charged, thereby preventing the transistors Q11 and Q13 from attaining a conducting state. On the other hand, under an abnormal condition, the transistor Q12 is held in a non-conducting state, the capacitor C3 gets fully charged and the transistors Q13 and Q11 attain a conducting state.

A diode D9 is connected between the base of the transistor Q7 of the acceleration drive circuit 25 and the collector of the transistor Q11 of the watch dog timer circuit 27 to permit the flow of electric current from the base of the transistor Q7 to the collector of the transistor Q11. Another diode D10 is likewise connected between the base of the transistor Q4 and the collector of the transistor Q11.

The base of the transistor Q5 of the deceleration drive circuit 26 is connected to the collector of a transistor Q14 by way of a resistor R24 while the emitter of the transistor Q14 is connected to the base of the transistor Q6. The emitter or the transistor Q15 is connected to the unregulated power line Vb and a resistor R26 is connected across the collector of the transistor Q15 and the base of the transistor Q14 which is grounded by way of a resistor R25. A resistor R28 is connected across the emitter and the base of the transistor Q15. Further, the base of the transistor Q15 is connected to the collector of the transistor Q11 by way of a resistor R27 and a diode D11 which permits the flow of electric current from the base of the transistor Q15 to the collector of the transistor Q11.

In the actuator drive circuit 5, when any abnormal condition has taken place, the transistor Q11 turns on and the bases of the transistors Q2, Q4 and Q7 are grounded. Therefore, irrespective of the states of the terminals CT1, CT3 and CT4, the transistors Q2, Q4 and Q7 are brought into non-conductive states. Further, since the conductive state of the transistors Q11 causes the transistors Q15 and Q14 to be in conductive states, the transistors Q5 and Q6 are brought into conductive states irrespective of the states of the terminals CT5 and CT6. Therefore, when any abnormal condition is detected in the CPU 7, the transistor Q2 for driving the solenoid 32 of the electromagnetic clutch 31 is turned off and an acceleration drive circuit 25 comprising the transistors Q3 and Q4 is turned off while a deceleration drive circuit 26 comprising the transistors Q5 and Q6 is turned on. Additionally, when the transistor Q11 turns on, the base of the transistor Q2 is grounded by way of the diode D8 and this in turn causes the solenoid 32 to be deactivated by way of the output transistor Q1.

Further, according to this embodiment, since the electric power to the acceleration drive circuit 25 comprising the transistors Q3 and Q4 and the electromagnetic clutch drive circuit comprising the transistor Q1 is supplied from the terminal T6 in both cases, when the cruise condition is discontinued by the action of the brake pedal, the power to the acceleration drive circuit 25 and the electromagnetic clutch drive circuit is positively disconnected by the brake switch 18. Thus, the brake switch 18 has the function of overriding the control of the CPU 7 and this feature contributes to improving the reliability of the cruise control system. On the other hand, the deceleration drive circuit 26 is directly connected to the power line Vb, and the capability of the system to decelerate the vehicle is maintained irrespective of the state of the brake switch 18. This is also advantageous according to the principle of fail-safe.

Now the action of this cruise control system is described in the following.

When the ignition switch 9 and the main switch 11 are both turned on, electric power is supplied to the control unit 1 and the main indicator lamp 12 turns on. If the set switch 15 is closed when the conditions for cruise control, such that the brake switch 18 or the clutch switch 19 is not activated and that the vehicle speed is greater than a certain minimum value, are satisfied, a target vehicle speed is stored in the CPU 7 according to the signal from the vehicle speed sensor 13.

Thereafter, the control unit 1 activates the actuator unit 21 as required to maintain the vehicle speed at this set level.

When the control unit 1 drives the actuator unit 21 according to the difference between the set level and the actual vehicle speed, a drive signal is supplied from the CPU 7 to the solenoid 32 of the electromagnetic clutch 31 by way of the input/output circuit 4 and engages the electromagnetic clutch 31. When the vehicle speed is less than the target vehicle speed and is required to be increased, signals from the terminals CT3 and CT4 turn on the transistors Q7 and Q8 while signals from the terminals CT5 and CT6 turn off the transistors Q9 and Q10. When the vehicle speed is greater than the target vehicle speed and is required to be decreased, the signals from the terminals CT3 to CT6 reverse the states of the transistor Q7 to Q10. Thus, the electric current supplied to the motor 33 is reversed as required and the actual vehicle speed is controlled to be substantially in agreement with the target vehicle speed. The resume switch 16 is for resetting the preceding target vehicle speed to resume the cruise control after an interruption of the cruise control.

The interruption of the cruise control happens when the CPU 7 has detected a cancel signal produced by the activation of the brake switch 18 or the clutch switch 19. When the cruise control is to be interrupted, the CPU 7 sends a deceleration signal to the actuator drive circuit 5 in order to drive the actuator in the direction to close the throttle valve 35 and decelerate the vehicle and the indicator lamp 23 turns off.

According to the present embodiment, since the power lines leading to the acceleration drive circuit 25 and the deceleration drive circuit 26 are separately provided and the normally closed contact S2 of the brake switch 21 is interposed in the power line leading to the acceleration drive circuit 25 and the power transistor Q1 for controlling the electromagnetic clutch 31, the supply of electric power to the acceleration drive circuit 31 and the electromagnetic clutch 31 is discontinued as soon as the brake pedal is pressed. This assures the shutting off of the cruise control even when an abnormal condition of any sort has occurred. For instance, even when both the power transistors Q3 and Q4 of the acceleration drive circuit have short-circuited, supply of electric current to both the solenoid 32 of the electromagnetic clutch 31 and the acceleration drive circuit 25 is prevented simply by pressing the brake pedal.

In this cruise control system, when the CPU 7 becomes faulty due to reasons which may be related to the software or the hardware of the micro processor, the CPU 7 may produce confused output signals from the terminals CT3 to CT9. For instance, if the terminals CT3 and CT6 were both brought to high levels, the transistors Q3 and Q6 would be both brought to conductive states and could be destroyed due to the state of short-circuiting.

However, according to the present invention, since not only the transistor Q11 turns on and the electromagnetic clutch 31 is disconnected but also the transistors Q7 and Q4 of the acceleration drive circuit 25 are both brought into non-conductive states, there will be no short-circuiting between the transistors Q3 and Q6 and the transistors Q4 and Q5 Moreover, the deceleration drive circuit 26 is turned on and the motor 33 is driven in the direction to decelerate the vehicle. Thus, in the case of an abnormal condition of the CPU 7, the actuator is positively driven in the direction to decelerate the vehicle by two different means and this serves as a highly reliable fail safe system.

Figure 2:
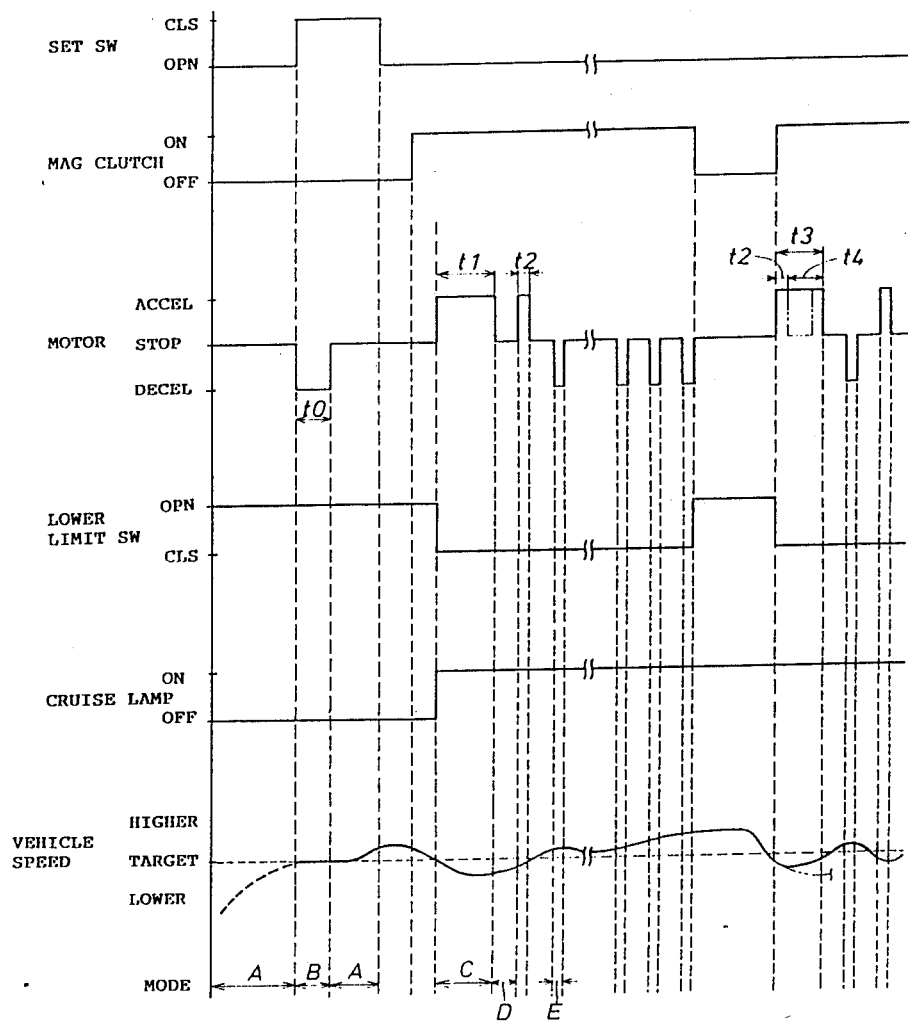
FIG. 2 is a time chart for describing the action of the embodiment shown in FIG. 1.
Figure 3:
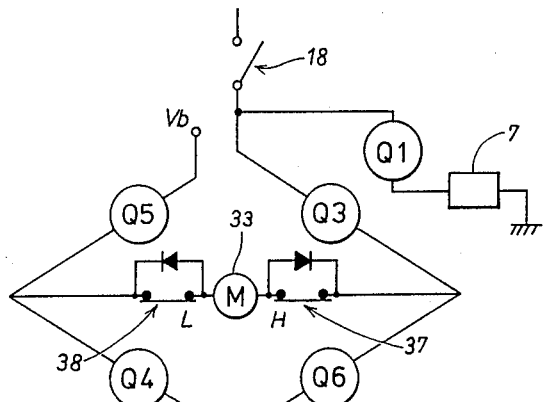
FIG. 3 is a simplified circuit diagram of the drive circuits in FIG. 1 for driving the electromagnetic clutch and the motor.

Now the action of the present embodiment, including a self diagnosing action thereof, is described in the following with reference to the time chart given in FIG. 2.

Initially, the main switch 11 is on; the set switch 15 is open; the magnetic clutch 31 is disconnected; the lower limit switch 38 is open; and the motor 33 is stationary. This state is mode A. When the set switch 15 is pressed by the driver, the CPU 7 produces a decelerating signal as an initializing signal for a time period t1 (=500 msec) but since the lower limit switch 38 is open the motor 33 remains stationary. This state is mode B. This mode is for the purpose of the self diagnosis of the system as described hereinafter. Mode A occurs again after the motor 33 stops, and lasts until the set switch 15 is released.

After a certain time delay upon completion of the initialization of the motor 33 in mode B, the electromagnetic clutch 31 is engaged and the motor 33 is driven in the direction to accelerate the vehicle with a pulse having a width t1 which is greater than that of a normal pulse. The lower limit switch 38 is now closed. This process is mode C and is provided for the purpose of taking up any slack which may be present between the actuator and the throttle valve and preventing any ill effect arising from such a slack from being noticeable to the driver At the same time, the cruise indicator lamp 22 is lighted up.

Upon completion of this mode C, the system advances to the step of comparing the current vehicle speed and the target vehicle speed and, in the meantime, the motor 33 remain stationary. This process is mode D. If the current vehicle speed is less than the target vehicle speed a pulse of width t2 for acceleration is generated and if the current vehicle speed becomes greater than the target vehicle speed a similar pulse for decelerator is produced as mode E in the time chart of FIG. 2. In this way, the vehicle speed is adjusted to the target vehicle speed and the pulse width or the pulse frequency may be varied as desired in order to accomplish this control action.

If the current vehicle speed becomes excessive and can not be controlled to the target vehicle speed even after the limit switch 38 has been opened with the actuator being turned to its lower limit (this happens when the vehicle runs down a long slope and the vehicle speed cannot be controlled even when the throttle valve is completely closed), the magnetic clutch 31 is disengaged and the throttle pedal is kept at its released condition. Thus, the motor 33 is liberated from any load. When the vehicle speed drops below the target vehicle speed, a pulse of a relatively large width t3 (=t2+t4) for acceleration is produced and the vehicle speed is again controlled to the target vehicle speed by the cruise control. By providing this boosted acceleration signal, the vehicle speed is prevented from dropping excessively from the target vehicle speed due to the insufficiency of the control action arising from the presence of any slack or play in the linkage system between the actuator and the throttle valve 35.

Table 1 summarizes a self diagnosis procedure for the drive transistors Q1 and Q3 to Q6 according to the present invention.

TABLE 1

| | capabilities to be tested | | | | | | | | |
|---|---|---|---|---|---|---|---|---|---|
| | acceleration drive transistors | | | | deceleration drive transistors | | | | clutch drive transistor |
| | Q3 | | Q4 | | Q5 | | Q6 | | Q1 |
| modes | close | open | close | open | close | open | close | open | close | open |
| A: before cruise control | | X | | X | | X | | X | | X |
| B: initial deceleration drive signal | | X | | X | | | | | | |
| C: initial acceleration drive signal | X | | X | | | | | | | |
| D: cruise control with actuator in neutral | | X | | X | | X | | X | X | |
| E: deceleration drive signal | | | | | X | | X | | | |

In mode A, all the transistors Q1 and Q3 to Q5 are in non-conducting states. According to the present embodiment, the transistors Q3 to Q6 are turned on one by one and the opening capabilities of the transistors connected in series with the transistor which is turned on are tested. For instance, when the transistor Q3 is turned on, no electric current will be detected by the current detection circuit 6. If that is the case, then it follows that the transistors Q4 and Q6 are in non-conductive states as required and the opening capabilities of the transistors Q4 and Q6 are tested. If no electric current is detected at the terminal CT8 of the CPU 7, it shows that the transistor Q1 is in a non-conductive state as required. This proves the opening capability of the transistor Q1.

In mode B, the transistors Q5 and Q6 are turned on merely for the purpose of self diagnosis and the motor 33 remains stationary because the lower limit switch 38 is open. Therefore, if the current detecting circuit 6 detects any electric current, it shows that the transistor Q3 or Q4 is permanently closed or, in other words, is incapable of opening.

In mode C, the transistors Q3 and Q4 are turned on for the purpose of turning the motor 33 in the direction to accelerate the vehicle. Therefore, if the current detecting circuit 6 detects any electric current, it shows that the transistors Q3 and Q4 are capable of closing or turning into conductive states.

In mode D, the opening capabilities of the transistors Q3 to Q6 can be tested in the same way in the mode A. Furthermore, since the transistor Q1 is intended to be closed, if any electric current is detected at the terminal CT8 of the CPU 7, it shows that the transistor Q1 is capable of closing.

In mode E, the transistors Q5 and Q6 are turned on for the purpose of turning the motor 33 in the direction to decelerate the vehicle. Therefore, if the current detecting circuit 6 detects any electric current, it shows that the transistors Q5 and Q6 are capable of closing or turning into conductive states.

Thus, the closing and opening capabilities of all the drive transistors Q1 and Q3 to Q6 can be checked in an early stage of cruise control, and any possible failure in these drive transistors can be detected so that the system can be shut off before any problem arises. If any failure is detected in the modes A to E, a cancel signal may be produced, thus disabling the function of the set switch 15.

Figure 4:
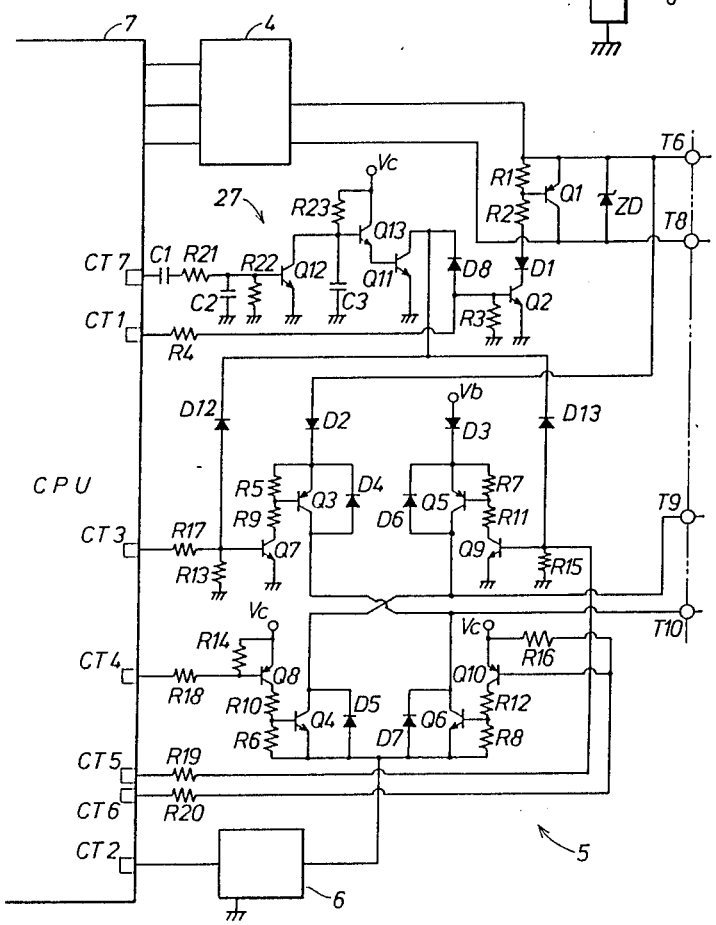
FIG. 4 is a circuit diagram of a part of a second embodiment of the vehicle cruise control system according to the present invention.

FIG. 4 shows a second embodiment of the drive circuit 5 according to the present invention. In this embodiment, output of the watch dog timer circuit 27 is connected only to the bases of the transistors Q7 and Q9 by way of diodes D12 and D13, respectively. In this embodiment, if the transistor Q11 is brought into a conductive state due to any abnormality detected by the watch dog timer circuit 27, the bases of the transistors Q7 and Q8 are pulled down and the transistors Q3 and Q5 are forced into non-conductive states. This prevents any short-circuiting in the transistor bridge circuit of the drive circuit 5.

Thus, according to either embodiment of the present invention, even when the CPU 7 produces a signal which may otherwise cause the dead short-circuiting of the drive transistors of the drive circuit, the transistors are protected from destruction and in the case of the first embodiment, the actuator is even driven in the direction to decelerate the vehicle.

Although the above embodiments pertained to an actuator drive circuit using a transistor bridge circuit, the present invention can be applied to other forms of transistor drive circuits without departing from the spirit of the present invention.

What we claim is:

1. A vehicle cruise control system, comprising:
   a control circuit for producing a control signal for maintaining a speed of a vehicle at a fixed level according to a difference between an actual vehicle speed and a target vehicle speed; and
   a drive circuit for producing a drive signal for selectively driving an actuator in a direction either to accelerate the vehicle or to decelerate the vehicle according to the control signal from the control circuit, wherein:
   the drive circuit is provided with a transistor bridge circuit comprising four drive transistors for producing the drive signal; and
   the control circuit is provided with a detecting means for detecting an abnormal control signal and for detecting an abnormal drive signal, and an inhibiting means which switches at least one of the drive transistors into a nonconductive state when any abnormal control signal is detected by the detecting means and when any abnormal drive signal is detecting by the detecting means.

2. A vehicle cruise control system as defined in claim 1, wherein the inhibiting means at one time switches into conductive states the transistors in a first path in the bridge for driving the actuator in the direction to accelerate the vehicle and at a second time switches into conductive states the other transistors in a second path in the bridge for driving the actuator in the direction to decelerate the vehicle.

3. A vehicle cruise control system as defined in claim 1, wherein the inhibiting means at one time switches into nonconductive state at least one of the transistors in a first path in the bridge for driving the actuator in the direction to accelerate and at a second time switches into a conductive state at least one of the transistors in a second path in the bridge for driving the actuator in the direction to decelerate the vehicle.

4. A vehicle cruise control system as defined in claim 1, wherein the control circuit comprises a micro processor and the detection means comprises a circuit which monitors for abnormal signals at an output of the micro processor.

5. A vehicle cruise control system as defined in claim 1, wherein the detector means comprises a circuit connected to at least one of the drive transistors for monitoring the state of at least one of the drive transistors.

6. A vehicle cruise control system as defined in claim 1, wherein a brake switch is interposed in a first power line leading to one of the transistors located in a first path for accelerating the vehicle, and one of the transistors located in a second path for decelerating the vehicle is directly connected to a second power line.

7. A vehicle cruise control system as defined in claim 1, wherein the drive circuit further comprises a transistor for controlling an electromagnetic clutch interposed in output shaft means of the actuator.

8. A vehicle cruise control system as defined in claim 7, wherein a brake switch which opens upon pressing of a brake pedal is interposed in a power line leading to the transistor for controlling the electromagnetic clutch.

9. A vehicle cruise control system as defined in claim 7 wherein:
   the actuator comprises a limit switch for indicating a limit of a stroke of the output shaft means of the actuator in a direction to decelerate the vehicle; and
   the detection means disconnects the electromagnetic clutch when it has detected that the limit of the stroke of the output shaft means of the actuator in a direction to decelerate the vehicle has been reached and that a drive signal to decelerate the vehicle is being produced from the control circuit, and connects the electromagnetic clutch when it has thereafter detected that a drive signal to accelerate the vehicle is produced.

10. A vehicle cruise control system a defined in claim 9, wherein the control circuit supplies a drive signal for accelerating the vehicle to the drive circuit when the detection means reconnects the electromagnetic clutch after the detection means has disconnected the electromagnetic clutch.

11. A vehicle cruise control system comprising:
    a control circuit for producing a control signal for maintaining a speed of a vehicle at a fixed level according to a difference between an actual vehicle speed and a target vehicle speed; and
    a drive circuit for producing a drive signal for selectively driving an actuator in a direction either to accelerate the vehicle or to decelerate the vehicle according to the control signal from the control circuit; wherein:
    the drive circuit comprises an acceleration drive circuit and a direction drive circuit; and
    the acceleration drive circuit is connected to a first power line by way of a brake switch which opens upon pressing of a brake pedal while the deceleration drive circuit is directly connected to a second power line;
    wherein the drive control further comprises a transistor for controlling an electromagnetic clutch interposed in an output shaft of the actuator.

12. A vehicle cruise control system as defined in claim 11, wherein the transistor for controlling the electromagnetic clutch is connected to the first power line by way of the brake switch.

13. A method of diagnosing drive transistors in a vehicle cruise control system comprising:
a control circuit for producing a control signal for maintaining a speed of a vehicle at a fixed level according to a difference between an actual vehicle speed and a target vehicle speed;
an electric actuator for driving a vehicle speed control means either to accelerate or to decelerate a vehicle;
an electromagnetic clutch interposed in an output shaft of the actuator; and
a drive circuit comprising a transistor bridge circuit having four drive transistors for controlling the actuator and a drive transistor for controlling the electromagnetic clutch, the drive circuit producing a drive signal for selectively driving the actuator in a direction either to accelerate the vehicle or to decelerate the electromagnetic clutch according to the control signal from the control circuit; comprising the steps of:
the control circuit sending a signal to switch to a conductive state one of the drive transistors; and
testing the capability to be in a nonconductive state of a transistor which is connected in series with the drive transistor which has been switched to a conductive state after a power switch to the vehicle cruise control system is turned on and before a set switch for initiating a cruise control is activated.

14. A method of diagnosing drive transistors in a vehicle cruise control system as defined in claim 13, further comprising the steps of:
testing the capability to be in a nonconductive state of the transistor for driving the electromagnetic clutch by detecting electric current conducted by said transistor after the set switch is activated and before the electromagnetic clutch is connected; and
testing the capability to be in a conductive state of the transistor for driving the electromagnetic clutch by detecting electric current conducted by the transistor after the electromagnetic clutch is connected.

15. A method of diagnosing drive, transistors in a vehicle cruise control system as defined in claim 13, further comprising the steps of:
sending a drive signal for accelerating the vehicle from the control circuit to the transistor bridge circuit to take up any slack in a linkage between the output shaft means of the actuator and the vehicle speed control means immediately after the electromagnetic clutch is connected; and
testing the capability to be in a nonconductive state of the drive transistors located in a path for accelerating the vehicle.

16. A method of diagnosing drive transistors in a vehicle cruise control system as defined in claim 13, further comprising the steps of:
sending a deceleration signal from the control circuit to the transistor bridge circuit after a set switch for initiating a cruise control is activated and before the electromagnetic clutch is connected; and
testing the capability to be in a conductive state of the drive transistors in a path for accelerating the vehicle.

17. A method of diagnosing drive transistors in a vehicle cruise control system as defined in claim 14, further comprising the steps of:
sending an acceleration signal from the control circuit to the transistor bridge circuit after a set switch is activated and before the electromagnetic clutch is connected; and
testing the capability to be in a conductive state of the drive transistors in a path for decelerating the vehicle.

* * * * *